United States Patent
Thomas et al.

(10) Patent No.: US 8,693,682 B2
(45) Date of Patent: Apr. 8, 2014

(54) DATA ENCRYPTION

(75) Inventors: Nithin Mohan Thomas, Cardiff (GB); David Roger Bull, Chepstow (GB); David Wallace Redmill, Bristol (GB)

(73) Assignee: SQR Systems Ltd, London (GB)

( * ) Notice: Subject to any disclaimer, the term of this patent is extended or adjusted under 35 U.S.C. 154(b) by 676 days.

(21) Appl. No.: 12/732,006

(22) Filed: Mar. 25, 2010

(65) Prior Publication Data
US 2010/0246816 A1 Sep. 30, 2010

(30) Foreign Application Priority Data

Mar. 26, 2009 (GB) .................................. 0905184.8

(51) Int. Cl.
| | |
|---|---|
| H04L 29/06 | (2006.01) |
| H04L 9/18 | (2006.01) |
| H04L 9/06 | (2006.01) |
| H04L 9/08 | (2006.01) |
| H04N 7/167 | (2011.01) |
| H04N 21/4408 | (2011.01) |

(52) U.S. Cl.
CPC .. *H04L 9/18* (2013.01); *H04L 9/06* (2013.01); *H04L 9/08* (2013.01); *H04N 7/1675* (2013.01); *H04N 21/4408* (2013.01)
USPC .................. 380/42; 380/43; 380/44; 380/45; 380/46; 380/47

(58) Field of Classification Search
CPC .............. H04L 9/18; H04L 9/06; H04L 9/08; H04L 9/0693; H04N 7/1675; H04N 21/4408
USPC ............. 380/42, 43, 255, 278–279; 713/171; 726/36
See application file for complete search history.

(56) References Cited

U.S. PATENT DOCUMENTS

| | | | | |
|---|---|---|---|---|
| 5,195,136 A | * | 3/1993 | Hardy et al. | 380/43 |
| 7,283,589 B2 | * | 10/2007 | Cai et al. | 375/240.26 |
| 7,917,747 B2 | * | 3/2011 | Wolf | 713/161 |

(Continued)

OTHER PUBLICATIONS rfc3711, "The secure real-time transport protocol", Mar. 2004.*

(Continued)

*Primary Examiner* — Andy Rao
*Assistant Examiner* — Shan Elahi
(74) *Attorney, Agent, or Firm* — Weaver Austin Villeneuve & Sampson LLP

(57) ABSTRACT

A system for encryption, and subsequent decryption, of encoded data allows for transcoding of the encrypted data. The data is encoded in such a way that different packets have different importance levels, so that some or all of the packets at the lower importance levels can be discarded or truncated in order to reduce the data rate. This is achieved by introducing dependencies into the encoding process. The packets at the highest importance level are encoded with reference only to other packets at the highest importance level, while the encoding of packets at lower importance levels also depend on the encoding of the packets at the highest importance level. The encoded data is then encrypted in such a way that the encryption process has dependencies that correspond to the dependencies in the encoding process. Packets at the highest importance level are encrypted with reference to other encrypted packets at the highest importance level, while the encryption of packets at lower importance levels also uses the results of encrypting the packets at the highest importance level.

18 Claims, 5 Drawing Sheets

(56) References Cited

U.S. PATENT DOCUMENTS

| | | | |
|---|---|---|---|
| 7,953,224 B2* | 5/2011 | Zhu et al. | 380/217 |
| 8,077,601 B2* | 12/2011 | Maze et al. | 370/216 |
| 8,319,820 B2* | 11/2012 | Wiener et al. | 348/14.09 |
| 2004/0022518 A1* | 2/2004 | Taga et al. | 386/46 |
| 2004/0132442 A1* | 7/2004 | Zimmermann et al. | 455/423 |
| 2004/0175055 A1* | 9/2004 | Miller et al. | 382/284 |
| 2005/0195900 A1* | 9/2005 | Han | 375/240.21 |
| 2005/0251491 A1* | 11/2005 | Medina et al. | 705/71 |
| 2007/0033391 A1* | 2/2007 | Hiramatsu et al. | 713/153 |
| 2007/0081670 A1* | 4/2007 | Topham et al. | 380/239 |
| 2007/0091884 A1* | 4/2007 | Wee et al. | 370/389 |
| 2007/0110237 A1* | 5/2007 | Tehranchi et al. | 380/201 |
| 2007/0237327 A1* | 10/2007 | Taylor et al. | 380/37 |
| 2008/0310497 A1* | 12/2008 | Amonou et al. | 375/240.01 |
| 2009/0217047 A1* | 8/2009 | Akashika et al. | 713/175 |
| 2010/0020871 A1* | 1/2010 | Hannuksela et al. | 375/240.12 |

OTHER PUBLICATIONS

Thomas, N. et al., "A novel H.264 transcoder using selective encryption," Proc. Int. Conf. on Image Processing, vol. 4, pp. 85-88, Sep. 2007.

Apostolopoulos, J.G., "Architectural Principles for Secure Streaming & Secure Adaptation in the Developing Scalable Video Coding (SVC) Standard," Proceedings of IEEE International Conference on Image Processing, pp. 729-732, Oct. 2006.

Yuan, C. et al., "Efficient and Fully Scalable Encryption for MPEG-4 FGS," Proceedings of International Symposium on Circuits and Systems, vol. 2, pp. 620-623, May 2003.

Stutz, T. et al., "Format-compliant Encryption of H.264/AVC and SVC," Proceedings of IEEE International Symposium on Multimedia, pp. 446-451, Dec. 2008.

Mukherjee, D. et al., "Format Independent Encryption of Generalized Scalable Bit-streams Enabling Arbitrary Secure Adaptations," Proc. Int. Conf. on Acoustics, Speech and Signal Processing, vol. 2, pp. 1033-1036, Mar. 2005.

Alattar, M. et al., "Improved Selective Encryption Techniques for Secure Transmission of MPEG Video Bit-Streams", *Proc. 1999 International Conference on Image Processing*, vol. 4, pp. 256-260, Oct. 1999.

Internet Streaming Media Alliance, Internet Streaming Media Alliance Encryption and Authentication, Version 2.0, Nov. 2007.

Tang, L., "Methods for Encrypting and Decrypting MPEG Video Data Efficiently", *Proc. 4th ACM International Multimedia Conference*, Nov. 1996.

Shi, C. et al., "MPEG Video Encryption in Real-Time Using Secret Key Cryptography", *International Conference on Parallel and Distributed Processing Techniques and Applications*, Jun. 1999.

Schwarz, H. et al., "Overview of the Scalable Video Coding Extension of the H.264/AVC Standard," IEEE Trans. on Circuits and Systems for Video Technology, vol. 17, No. 9, pp. 1103-1120, Sep. 2007.

Cheng, H. et al., "Partial encryption of compressed images and videos," IEEE Trans. on Signal Processing, vol. 48, No. 8, pp. 2439-2451, Aug. 2000.

Zhu et al., "Scalable Protection for MPEG-4 Fine Granularity Scalability," IEEE Trans. on Multimedia, vol. 7, No. 2, Apr. 2005.

Apostolopoulos, J.G., "Secure Media Streaming & Secure Adaptation for Nonscalable Video," Proceedings of the IEEE International Conference on Image Processing, vol. 3, Oct. 2004.

Wee, S.J. et al., "Secure Scalable Streaming Enabling Transcoding Without Decryption," Proceedings of IEEE International Conference on Image Processing, vol. 1, pp. 437-440, Oct. 2001.

Wee, S.J. et al., "Secure Scalable Video Streaming for Wireless Networks," Proc. Int. Conf. on Acoustics, Speech and Signal Processing, vol. 4, pp. 2049-2052, 2001.

Thomas, N. et al., "Secure transcoders for single layer video data", Signal Processing: Image Communication 25, pp. 196-207, 2010.

Meyer, J. et al., "Securitymechanisms for Multimedia-Data with the Example MPEG-I-Video", *Project Description of SECMPEG*, May 1995.

\* cited by examiner

DATA ENCRYPTION

BACKGROUND

This invention relates to a method and apparatus for encryption of data, in particular in the case where the data to be encrypted is in data blocks, and the data to be encrypted contains data blocks having different levels of importance.

It is known to generate data in a scalable form, that is, in a form in which the data remains usable, even if a part of the data is no longer present. Specifically, in the case of video data, it is known to generate the data in a form that is suitable for transmission over a wide variety of networks, or over a single network with variable characteristics. Then, the data is transcoded. That is, depending on the available bandwidth over which one copy of that data is to be transmitted, some of the data may be discarded, so that the remaining data rate matches the available bandwidth.

Examples of such scalable coding schemes include the H.264 SVC and MPEG-4 FGS coding schemes. In general terms, scalable coding schemes encode the video data in packets, with the packets having different levels of importance. If the encoded data is to be transmitted over a wide bandwidth network, then all of the data can be transmitted. If the encoded data is to be transmitted over a network having a smaller bandwidth, then some of the packets at the lower levels of importance can be truncated or dropped. If the encoded data is to be transmitted over a network having a still smaller bandwidth, more of the packets can be truncated or dropped.

Different coding schemes allow different types of scalability. For example, in the case, of temporal scalability, frames of the video sequence can be referred to as I frames, P frames, and B frames. In decoding the data, only packets relating to I frames are used in recreating the I frames; packets relating to I frames and to P frames are used in recreating the P frames; and packets relating to I frames and P frames as well as the B frames are used in recreating the B frames of the video sequence. Thus, data packets relating to I frames have the highest importance level, while data packets relating to B frames have the lowest importance level. If it is necessary to reduce the data rate, data packets relating to B frames can be dropped without affecting the ability to decode the I frames or the P frames. If it is necessary to reduce the data rate further, data packets relating to P frames can be dropped without affecting the ability to decode the I frames.

In the case of spatial scalability, data packets can be similarly arranged, so that all of the packets are required in order to recreate the video sequence at the maximum spatial resolution, while some of the packets having lower importance can be dropped, allowing the video sequence to be recreated, albeit with a lower spatial resolution.

In the case of quality scalability, the video data is similarly encoded into packets having a highest importance level, and other packets at one or more lower importance level. Starting by discarding packets at the lowest importance level, the data rate can be reduced, while still allowing the video sequence to be recreated from the remaining data packets at a lower quality.

As mentioned above, there are various scalable encoding schemes, allowing different types of scalability, and different levels of scalability. In all cases, the data is encoded in packets having different levels of importance, such that some or all of the packets having lower importance can be dropped, allowing the video sequence to be recreated from the packets having higher importance.

It is also known to encrypt video data before transmission, for example so that a content provider can ensure that only a paying subscriber is able to decrypt the data and see the video.

In the case of data that is to be encrypted in its entirety, and then transmitted to a recipient, it is possible to use a chaining encryption and decryption scheme, whereby the first block of data is combined with an Initialization Vector, before being encrypted with a known key. The result of this encryption is then combined with the second block of data, before being encrypted with the known key, and so on. The Initialization Vector can be sent to the recipient and, if that recipient also knows the key, the recipient is able to decrypt the data.

However, because it is necessary to decrypt every block of data, in order to be able to decrypt the subsequent blocks, it is not possible to use this scheme to encrypt data that might be transcoded before it is decrypted.

As an alternative, in principle, it is possible to encrypt each packet of the data independently so that, in the transcoding process, some of the data packets can be discarded, and the remaining packets can still be decrypted. However, this means either that the same Initialization Vector must be used to encrypt and decrypt multiple blocks of data, which reduces the security of the encryption, or that a different Initialization Vector for each data block must be transmitted to the recipient, which significantly increases the total amount of data to be transmitted. The other alternative would be to avoid the use of initialization vectors altogether, leading to a lower level of security.

SUMMARY

According to an aspect of the invention, there is provided a method of encrypting a data stream, wherein the data stream comprises encoded packets of data, and the packets of data include packets having a first importance level, and packets having a second importance level, the second importance level being lower than the first importance level, wherein the method comprises:

encrypting a first packet of data having the first importance level to generate a first encrypted packet;

encrypting a second packet of data having the first importance level to generate a second encrypted packet, wherein the step of encrypting the second packet of data having the first importance level uses the first encrypted packet; and encrypting a first packet of data having the second importance level to generate a third encrypted packet, wherein the step of encrypting the first packet of data having the second importance level uses the first encrypted packet.

According to another aspect of the invention, there is provided a method of encrypting a data stream, wherein the data stream comprises packets of data, the packets of data being encoded by means of an encoding method that introduces encoding dependencies between the packets, the method comprising:

encrypting the packets by means of an encrypting method that introduces encrypting dependencies between the packets, wherein the encrypting dependencies between the packets substantially match the encoding dependencies between the packets.

According to another aspect of the invention, there is provided a method of decrypting a data stream, wherein the data stream comprises encrypted encoded packets of data, and the encrypted encoded packets of data include packets having a first importance level, and packets having a second importance level, the second importance level being lower than the first importance level, wherein the method comprises:

decrypting a first encrypted encoded packet of data having the first importance level to generate a first decrypted packet;

using data from the first encrypted encoded packet of data in decrypting a second packet of data having the first importance level to generate a second decrypted packet; and using data from the first encrypted encoded packet of data in decrypting a first packet of data having the second importance level to generate a third decrypted packet.

DETAILED DESCRIPTION

Figure 1:
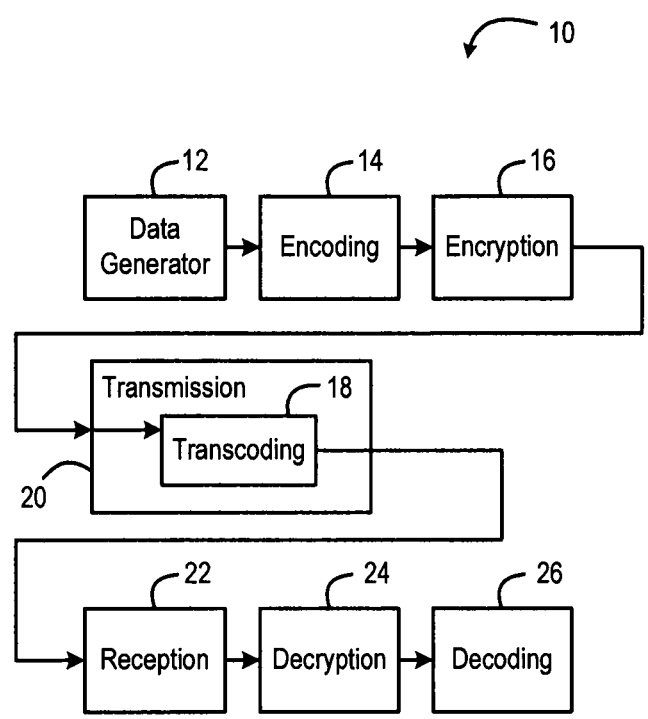
FIG. 1 is a block schematic diagram of a video transmission and reception system in accordance with an aspect of the present invention.

FIG. 1 shows a video transmission and reception system 10 operating in accordance with an aspect of the present invention.

The system shown in FIG. 1 includes a generator 12, for generating video data, and an encoder 14, for encoding the video data in accordance with the encoding scheme that is to be used. As an example, the invention will be described herein with reference to an illustrative embodiment in which the relevant encoding scheme is a version of the H.264 SVC encoding scheme, in which data is encoded with four levels of importance, as will be described in more detail below. The encoded data is then passed to an encryption block 16, which will be described in more detail below. In one typical application, the data generator 12, the encoding block 14 and the encryption block 16 might be under the control of an entity such as a television company, that is providing video content to a network service provider.

The encrypted data is passed to a transmission block 20, for transmission over a network to relevant subscribers. In this example, the transmission block 20 includes a transcoding block 18, where some of the encrypted data can be discarded, so that only the remaining data is transmitted. The transcoding block 18 is used to reduce the data rate of the video bitstream to an appropriate level. The same appropriate level might apply to all of the subscribers, or different subscribers might receive different data rates, depending for example on their receiving devices or on their subscription levels. In one typical application, the transcoding block 18 and the transmission block 20 might be under the control of a network service provider, such as a cable television company or a cellular telephone network operator. The transcoding can be carried out at any point in the system, for example after transmission over the network.

The encrypted video data is received by the subscriber at a receiver 22, and is then passed to a decryption block 24, and a decoding block 26, in order to put it into a form that is suitable for viewing on the relevant display device. In one typical application, the receiver 22, decryption block 24, and decoding block 26 are provided in a single device, such as a cellular phone or a television set-top box, under a subscriber's control.

Figure 2:
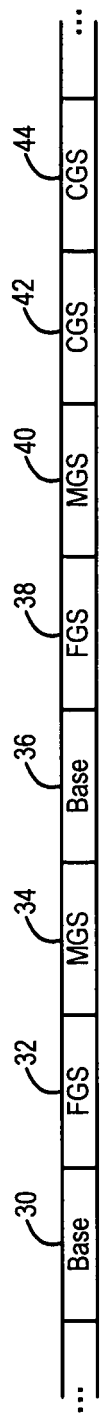
FIG. 2 is a schematic illustration of the form of a part of one possible bitstream in use in the system of FIG. 1.

FIG. 2 shows in more detail the form of the encoded data that is generated by the encoding block 14. In this example, each group of eight consecutive data packets contains a first base layer packet 30, a first Fine Grain Scalability (FGS) packet 32, a first Medium Grain Scalability (MGS) packet 34, a second base layer packet 36, a second FGS packet 38, a second MGS packet 40, a first Coarse Grain Scalability (CGS) packet 42, and a second CGS packet 44. In other examples of coding schemes, there may be many different arrangements of packets having different importance levels.

The base layer packets 30, 36 have the highest importance level; the FGS packets 32, 38, have the second highest importance level; the MGS packets 34, 40 have the third highest importance level; and the CGS packets 42, 44 have the lowest importance level. Thus, while the base layer packets 30, 36 are typically (though not necessarily) encoded in such a way that it is necessary to use the result of decoding one base layer packet when decoding the next base layer packet, any base layer packet can be decoded without using the result of decoding any packet from any other layer. The FGS packets are typically encoded in such a way that it is necessary to use the result of decoding the preceding base layer packet when decoding a given FGS packet, but any FGS packet can be decoded without using the result of decoding any packet from any layer at a lower importance level.

In this illustrative example, the MGS packets are encoded in such a way that it is necessary to use the result of decoding the preceding base layer packet when decoding a given MGS packet, but any MGS packet can be decoded without using the result of decoding any packet from the CGS layer at the lowest importance level. In this example, an MGS packet can be decoded without using the result of decoding any packet from the FGS layer, but other encoding schemes not having this property are possible.

In addition, in this illustrative example, the CGS packets are encoded in such a way that it is necessary to use the result of decoding at least one preceding base layer packet and the result of decoding the preceding CGS packet, when decoding a given CGS packet. In this example, a CGS packet can be decoded without using the result of decoding any packet from the FGS layer, but other encoding schemes not having this property are possible.

Thus, in general terms, the packets have different importance levels, and any given packet can be decoded by using only the results of decoding preceding packets having the same or a higher importance level, without requiring the result of decoding any packet having a lower importance level.

The result is that some of the packets can be discarded or cropped, without affecting the ability to decode the remaining data. In this illustrated example, the CGS packets can be referred to as layer packets, as it is possible to discard the entire CGS layer without affecting the ability to decode the remaining data. However, as the decoding of one CGS packet depends on the result of decoding the previous CGS packet, it is not possible to discard CGS packets on an individual basis.

Again, in this illustrated example, the MGS packets can be referred to as drop packets, as it is possible to drop any number of MGS packets, without affecting the ability to decode the remaining data. However, in this illustrated example, the MGS packets are encoded in such a way that it is not possible to discard just a part of an MGS packet and still be able to decode the remainder of the packet. As described in more detail below, therefore, the MGS packets are encrypted by means of a block cipher.

Again, in this illustrated example, the FGS packets can also be referred to as drop packets, as it is possible to drop any number of FGS packets, without affecting the ability to decode the remaining data. In addition, in this illustrated example, as described in more detail below, the FGS packets can be cropped, meaning that it is possible to discard just a part of an FGS packet and still be able to decode the remainder of the packet. As described in more detail below, therefore, the FGS packets are encrypted by means of a stream cipher, in order to preserve this characteristic.

Although the invention is illustrated with reference to this particular encoding and encryption scheme, it will be apparent that many other such schemes are also possible.

Figure 3:
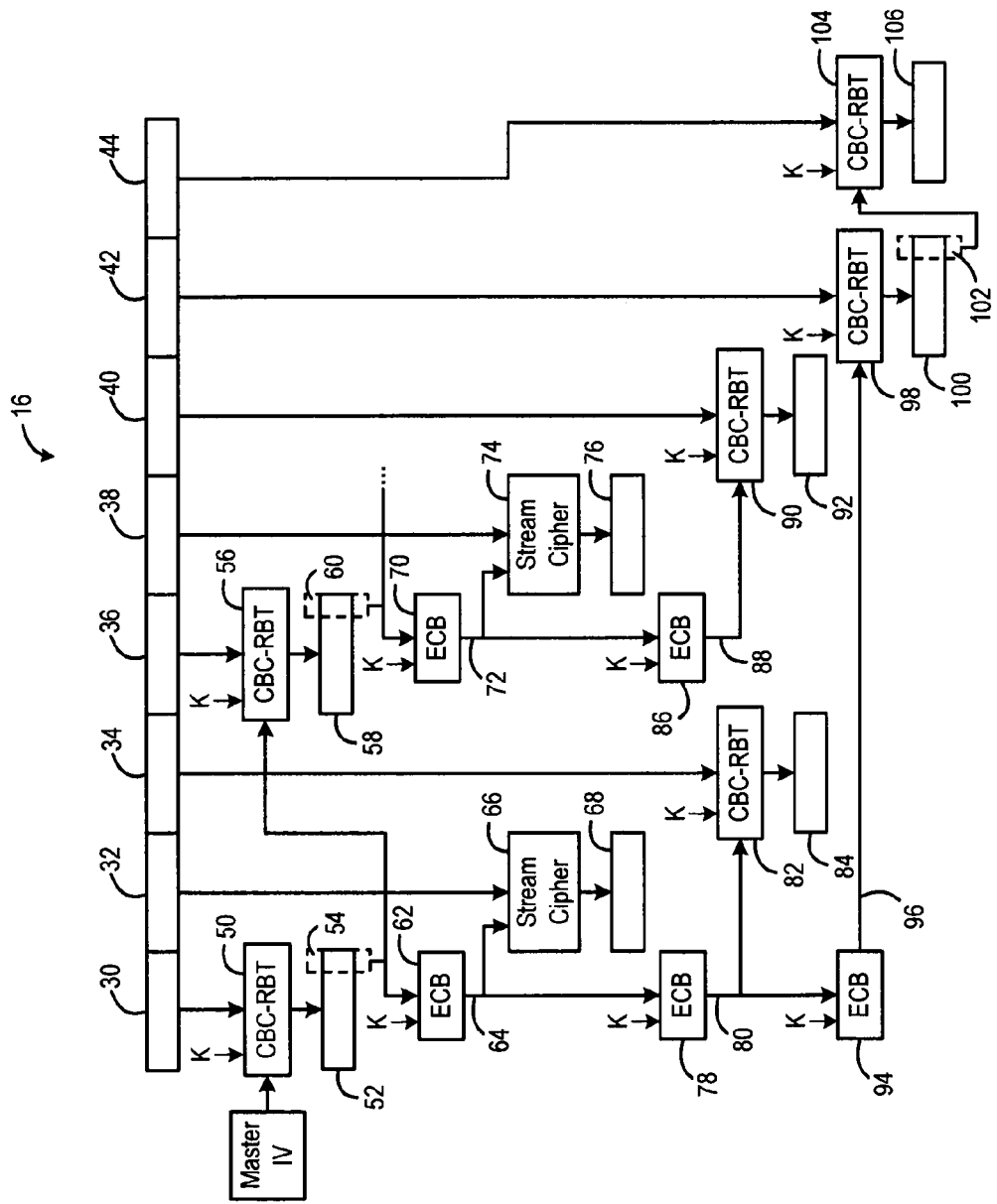
FIG. 3 is a schematic illustration of a method and system for encryption of the bitstream of FIG. 2.

FIG. 3 is a block schematic diagram, illustrating a method for encrypting the encoded data stream shown in FIG. 2 in the encryption block 16. In practice, the encryption can be carried out using software or hardware or a combination of software and hardware. In any event, FIG. 3 illustrates the steps that are taken in the encryption procedure.

The first base layer packet 30 in each section of the bitstream is encrypted in a block 50, which performs Cipher Block Chaining (CBC) with Residual Block Termination (RBT). Although the use of Residual Block Termination is described here, a different method for handling packets that are not a multiple of the encryption block size, such as padding, can be used as an alternative.

Figure 4:
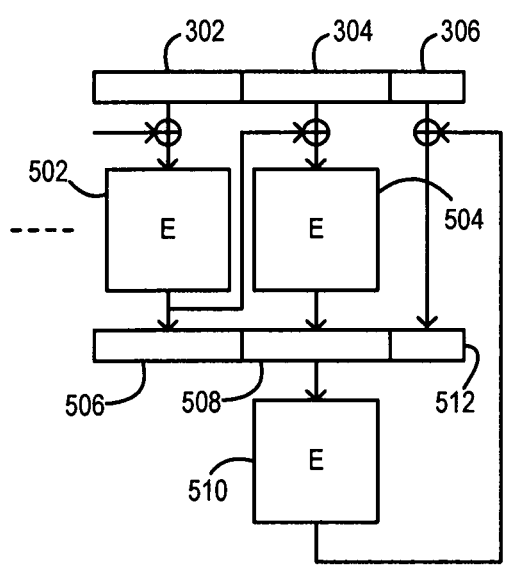
FIG. 4 is a schematic illustration of a part of the encryption system shown in FIG. 3.

FIG. 4 is a block diagram, illustrating the principle of Residual Block Termination in more detail. FIG. 4 shows only the last few data blocks in the data packet 30, in order to illustrate this principle. Each block 302, 304 within the data packet is passed to a respective encryption (E) function 502, 504, where it is encrypted to generate a respective encrypted data block 506, 508, and each encrypted data block 506, 508 is used in encrypting the next data block.

The last encrypted data block 508 is then encrypted again in an encryption (E) function 510 operating in Electronic Code Book (ECB) mode to generate a further encrypted result. The n bit residual unencrypted block 306 is then XORed with the first n bits of the further encrypted result, generated by the function 510, to generate the last n bits 512 of the encrypted result.

Thus, in this illustrated example, the first base layer packet 30 is encrypted in the block 50 using a block cipher, for example the well known Rijndael block cipher, with a block size and a key size of 128 bits, using a Master Initialization Vector (IV) and a key K. More specifically, the first encryption block within the packet 30 is XORed with the Master IV, although any reversible function can be used, and the result is encrypted using the key K. The result of this encryption is a first encrypted packet 52.

As is known in Cipher Block Chaining systems, the last 128 bits of the encrypted packet 52 are used as a new Initialization Vector 54. Other methods for generating the new Initialization Vector 54 from the encrypted packet 52 are equally possible. As just one example, another group of 128 bits of the encrypted packet 52 could be used as the new Initialization Vector 54.

The second base layer packet 36 is then encrypted in a block 56, which again performs Cipher Block Chaining (CBC) with Residual Block Termination (RBT), this time using the new Initialization Vector 54 and the same key K used previously. The result of this encryption is a second encrypted packet 58. The last 128 bits of the second encrypted packet 58 are then used as a second new Initialization Vector 60, to be used in encrypting further base layer packets.

In this illustrated embodiment, the new Initialization Vector 54 is also encrypted in an ECB block 62, using the same key as before, to generate a new 128 bit block 64.

The first FGS packet 32 is encrypted in a block 66, using a stream cipher, with the new 128 bit block 64 as the key, to generate a third encrypted packet 68.

Similarly, the second new Initialization Vector 60 is also encrypted in an ECB block 70, using the same key as before, to generate a new 128 bit block 72, and the second FGS packet 38 is encrypted in a block 74, using a stream cipher, with the new 128 bit block 72 as the key, to generate a fourth encrypted packet 76.

In this illustrated embodiment, the new 128 bit block 64 is also encrypted in an ECB block 78, using the same key as before, to generate a further new 128 bit block 80.

The new 128 bit block 80 is then used as the Initialization Vector in a third CBC-RBT block 82. The first MGS packet 34 is encrypted in the third CBC-RBT block 82 using the new 128 bit block 80 as the Initialization Vector, and using the same key as before, to generate a fifth encrypted packet 84.

Similarly, the new 128 bit block 72 is also encrypted in an ECB block 86, using the same key as before, to generate a further new 128 bit block 88, which is then used as the Initialization Vector in a fourth CBC-RBT block 90. The second MGS packet 40 is encrypted in the fourth CBC-RBT block 90 using the new 128 bit block 88 as the Initialization Vector, and using the same key as before, to generate a sixth encrypted packet 92.

In this illustrated embodiment, the new 128 bit block 80 is also encrypted in an ECB block 94, using the same key as before, to generate a further new 128 bit block 96. In an alternative embodiment, the 128 bit block 88 can be encrypted in an ECB block to generate this further new 128 bit block.

The new 128 bit block 96 is then used as the Initialization Vector in a fifth CBC-RBT block 98. The first CGS packet 42 is encrypted in the fifth CBC-RBT block 98 using the new 128 bit block 96 as the Initialization Vector, and using the same key as before, to generate a seventh encrypted packet 100.

The last 128 bits of the seventh encrypted packet 100 are used as a new Initialization Vector 102. The second CGS packet 44 is encrypted in a sixth CBC-RBT block 104 using the new Initialization Vector 102, and using the same key as before, to generate an eighth encrypted packet 106.

FIG. 3 shows an example in which a Master Initialization Vector is used in encrypting a first data packet, with the result of the encryption being used as the Initialization Vector in encrypting subsequent data packets, and so on, with a single encryption key being used in all encryptions. It will be appreciated that other schemes are possible. For example, the result of the first encryption might be used in generating a new key for a second encryption and the result of the second encryption being used in generating a new key for a subsequent encryption, with the same Initialization Vector being used in all encryptions.

After encryption, using the scheme illustrated in FIG. 3 or otherwise, the encrypted packets 52, 58, 68, 76, 84, 92, 100, 106 can then be assembled into an encrypted bitstream. An unencrypted unit header is associated with each encrypted packet, indicating, for example, whether the packet is a base layer packet, a FGS packet, a MGS packet or a CGS packet. When the encrypted data is passed to the transcoding block 18, it is then possible to identify each packet from this unencrypted unit header, and then decide on that basis whether to discard or to truncate the packet. Moreover, since it is possible that the encryption of any packet might generate a sequence of bytes that is similar to the unit header, an emulation flag is advantageously inserted into the bitstream after each unit header to confirm that the unit header is indeed a unit header.

It can thus be seen that the encryption scheme shown in FIG. 3 creates encryption dependencies between the packets that match the dependencies created during encoding. That is, the base layer packets are encrypted without reference to any packets in any lower layer, and thus can be decrypted even if all of the other encrypted packets are discarded before transmission. Since the base layer packets will not be affected by transcoding, there is no problem caused by the encryption dependencies between base layer packets.

The FGS packets are encrypted in dependence on the encryption of the base layer packets, but without reference to any MGS packets or CGS packets, and so they can be decrypted even if all of the MGS packets and CGS packets are discarded before or during transmission. In addition, the FGS packets are encrypted using a stream cipher, and so an FGS packet can be truncated before or during transmission, and it will still be possible to decrypt the transmitted encrypted data.

The MGS packets are encrypted in dependence on the encryption of the base layer packets, but without reference to any CGS packets, and so they can be decrypted even if all of the CGS packets are discarded before or during transmission.

The CGS packets are encrypted in dependence on the encryption of at least one base layer packets, but are also encrypted in dependence on the encryption of the preceding CGS packets. This means that, while the entire CGS layer can be discarded without affecting the decryption of any packets in any other layer, it is not possible to discard just some of the CGS packets and still be able to decrypt the remaining CGS packets. The encoding scheme used in this example means that it is not possible to discard just some of the encoded CGS packets and still be able to decode the remaining CGS packets, and so performing the encryption in this way does not involve any loss of functionality.

More generally, it can be seen that the encryption process generates a chain of dependencies. Further, the result of at least one encryption in the first chain of dependencies is also used in at least one encryption outside the first chain of dependencies, for example in generating a second chain of dependencies. That is, in this example, the result of the encryption carried out in the block 50 is used in the encryption carried out in the block 56, and the result of the encryption carried out in the block 56 is used in the encryption of the next base layer packet and so on. Also, the result of the encryption carried out in the block 50 is used in the encryption carried out in the block 98, and the result of the encryption carried out in the block 98 is used in the encryption of the next CGS packet in the block, and so on. In addition, the result of the encryption carried out in the block 50 is used in the encryptions carried out in the blocks 66, 82.

Figure 5:
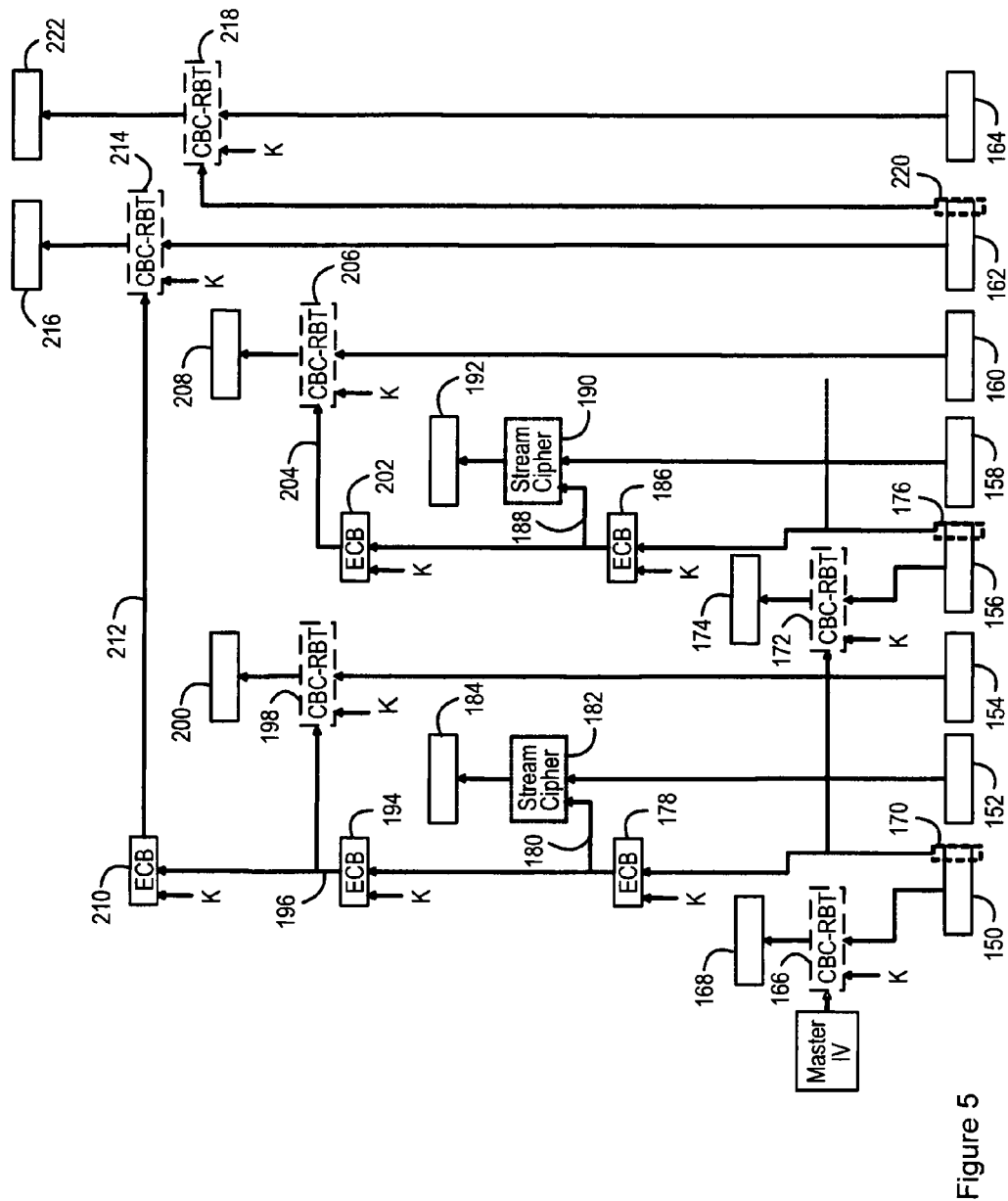
FIG. 5 is a schematic illustration of a method and system for decryption of the bitstream encrypted by the method and system of FIG. 3.

A decryption scheme, for decrypting the encrypted bit stream generated by the method shown in FIG. 3, is shown in FIG. 5. Thus, the encrypted bit stream contains encrypted packets 150, 152, 154, 156, 158, 160, 162, 164. As with the encryption, in practice, the decryption can be carried out using software or hardware or a combination of software and hardware. In any event, FIG. 5 illustrates the steps that are taken in the decryption procedure.

The first encrypted 150 in each section of the bitstream is decrypted in a block 166, which performs Cipher Block Chaining (CBC) with Residual Block Termination (RBT).

Figure 6:
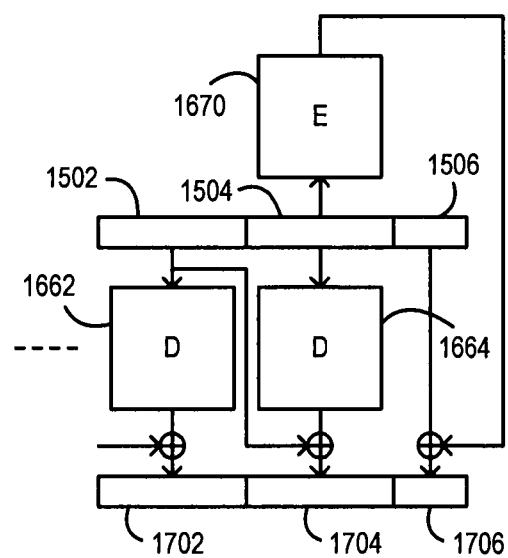
FIG. 6 is a schematic illustration of a part of the decryption system shown in FIG. 5.

FIG. 6 is a block diagram, illustrating the principle of Residual Block Termination in the decrypting stage in more detail. FIG. 6 shows only the last few data blocks in the data packet 150, in order to illustrate this principle. Each block 1502, 1504 within the data packet is passed to a respective decryption (D) function 1662, 1664, where it is decrypted to generate a respective decrypted data block 1702, 1704, and each encrypted data block 1502, 1504 is used in decrypting the next data block.

The last full encrypted data block 1504 is then encrypted again in an encryption (E) function 1670 operating in Electronic Code Book (ECB) mode to generate a further encrypted result. The n bit residual encrypted block 1506 is then XORed with the first n bits of the further encrypted result, generated by the function 1670, to generate the last n bits 1706 of the decrypted result.

Thus, in this illustrated example, the first encrypted packet 150 is decrypted in the block 166 using a block cipher corresponding to the cipher used at the encryption stage, with the same block size and key size of 128 bits, using the same Master Initialization Vector (IV) and a key K. The result of this decryption is a first decrypted packet 168.

As is known in Cipher Block Chaining systems, the last 128 bits 170 of the encrypted packet 150 are used in the next link of the chain, in a way corresponding to that used in the encryption stage.

The fourth encrypted packet 156 is then decrypted in a block 172, which again performs Cipher Block Chaining (CBC) with Residual Block Termination (RBT), this time using the block 170 from the first encrypted packet 150 and the same key K used previously. The result of this decryption is the second base layer packet 174. The last 128 bits 176 of the fourth encrypted packet 156 are then used in decrypting further base layer packets in the chain, as is conventional.

In this illustrated embodiment, the last 128 bits 170 of the first encrypted packet 150 are also encrypted in an ECB block 178, using the same key as before, to generate a new 128 bit block 180.

The second encrypted packet 152 is decrypted in a block 182, using a stream cipher, with the new 128 bit block 180 as the key, to generate a first decrypted FGS packet 184.

Similarly, the last 128 bits 176 of the fourth encrypted packet 156 are also encrypted in an ECB block 186, using the same key as before, to generate a new 128 bit block 188. The fifth encrypted packet 158 is then decrypted in a block 190, using a stream cipher, with the new 128 bit block 188 as the key, to generate a second decrypted FGS packet 192.

In this illustrated embodiment, the new 128 bit block 180 is also encrypted in an ECB block 194, using the same key as before, to generate a further new 128 bit block 196.

The third encrypted packet 154 is decrypted in a third CBC-RBT block 198 using the new 128 bit block 196, and using the same key as before, to generate a first decrypted MGS packet 200.

Similarly, the new 128 bit block 188 is also encrypted in an ECB block 202, using the same key as before, to generate a further new 128 bit block 204. The sixth encrypted packet 160 is decrypted in a fourth CBC-RBT block 206 using the new 128 bit block 204, and using the same key as before, to generate a second decrypted MGS packet 206.

In this illustrated embodiment, the new 128 bit block 196 is also encrypted in an ECB block 210, using the same key as before, to generate a further new 128 bit block 212.

The new 128 bit block 212 is then used in a fifth CBC-RBT block 214. The seventh encrypted packet 162 is decrypted in the fifth CBC-RBT block 214 using the new 128 bit block 212, and using the same key as before, to generate a first decrypted CGS packet 216.

The eighth encrypted packet 164 is decrypted in a sixth CBC-RBT block 218 using the last 128 bits 220 of the seventh encrypted packet 162, and using the same key as before, to generate a second CGS packet 222.

Thus, the decryption system uses a process that effectively reverses the steps taken in the encryption process.

Other encoding schemes are possible, in which there are more layers, or fewer layers, and in which some or all of the lower layers are dependent on one or more of the higher layers. In all such cases, it is possible to encrypt the encoded data in a way in which the encryption dependencies reflect the encoding dependencies, so that packets can be discarded from the encrypted data and the remaining data can still be decrypted.

In the illustrated embodiment, some of the packets are encrypted with one specific block cipher, and other packets are encrypted with one specific stream cipher. In other embodiments, all of the packets are encrypted using the same cipher while, in still further embodiments, different packets are encrypted using different ciphers.

In each case, a corresponding decryption scheme can be derived from the encryption scheme.

Although the invention has been described herein with reference to a specific example in which the data that is encrypted is video data, it will be apparent that the invention is equally applicable to the encryption of any data, particularly where the data is separated into packets having different levels of importance so that transcoding (i.e. data rate reduction by discarding or truncating some of the packets) can take place.

The invention claimed is:

1. A method of encrypting a data stream, wherein the data stream comprises encoded packets of data, wherein the method comprises:
   encrypting, using a first cipher and a first initialization vector or a first stream cipher key, a first encoded packet of data having a first importance level to generate a first encrypted packet having the first importance level;
   encrypting, using a second cipher and a second initialization vector or a second stream cipher key, a second encoded packet of data having the first importance level to generate a second encrypted packet having the first importance level, wherein the second initialization vector or the second stream cipher key is formed from a predetermined number of bits from the first encrypted packet; and
   encrypting, using a third cipher and the second initialization vector or the second stream cipher key, a third encoded packet of data having a second, lower, importance level to generate a third encrypted packet having the second importance level, wherein the third encoded packet of data is associated with the first encoded packet of data;
   wherein the first, second, and third encrypted packets are encoded with encoding dependencies that correspond to the importance levels of the first, second, and third encoded packets, such that decoding encoded packets having the second importance level requires a result of decoding an associated encoded packet having the first importance level, and such that encoded packets having the second importance level may be discarded without affecting the ability to decode encoded packets having the first importance level; and
   wherein the first, second, and third encrypted packets are encrypted with encryption dependencies that match the encoding dependencies of the corresponding encoded packets.

2. A method as claimed in claim 1, wherein the packets of data include packets having a third importance level, the third importance level being lower than the second importance level, such that packets of the third importance level can be discarded without affecting the ability to recreate the packets of the first and second importance levels, and wherein the method further comprises: encrypting a first packet of data having the third importance level to generate a fourth encrypted packet, wherein the step of encrypting the first packet of data having the third importance level uses the first encrypted packet.

3. A method of encrypting a data stream, wherein the data stream comprises packets of data, the method comprising:
   encrypting encoded packets having a first importance level by means of an encrypting method that uses results of encrypting other encoded packets having the first importance level; and
   encrypting encoded packets having a second, lower, importance level by means of an encrypting method that uses results of encrypting encoded packets having the first importance level;
   wherein the encoded packets are encoded with encoding dependencies that correspond to the importance levels of the encoded packets, such that decoding encoded packets having the second importance level requires a result of decoding an associated encoded packet having the first importance level, and such that encoded packets having the second importance level may be discarded without affecting the ability to decode encoded packets having the first importance level;
   wherein the first, second, and third encrypted packets are encrypted with encryption dependencies that match the encoding dependencies of the corresponding encoded packets;
   wherein packets of data encoded in such a way that an entire encoded packet is not required in order to decode a part of the encoded packet are encrypted by means of a stream cipher, and
   wherein packets of data encoded in such a way that an entire encoded packet is required in order to decode a part of the encoded packet are encrypted by means of a block cipher.

4. A method as claimed in claim 3, wherein the method further comprises:
   encrypting the encoded packets having the second importance level by means of an encrypting method that uses results of encrypting other encoded packets having the second importance level.

5. A method of decrypting a data stream, wherein the data stream comprises encrypted packets of data, wherein the method comprises:
   decrypting a first encrypted encoded packet of data having a first importance level to generate a first decrypted encoded packet;
   using data from the first encrypted encoded packet of data in decrypting a second encrypted encoded packet of data having the first importance level to generate a second decrypted encoded packet; and
   using data from the first encrypted encoded packet of data in decrypting a third encrypted encoded packet of data having a second, lower, importance level to generate a third decrypted encoded packet;
   wherein the first, second, and third decrypted encoded packets are encoded with encoding dependencies that correspond to the importance levels of the first, second, and third decrypted encoded packets, such that decoding decrypted encoded packets having the second importance level requires a result of decoding an associated decrypted encoded packet having the first importance level, and such that encrypted encoded packets having the second importance level may be discarded without affecting the ability to decode decrypted encoded packets having the first importance level; and wherein the first, second, and third encrypted encoded packets are encrypted with encryption dependencies that match the encoding dependencies of the corresponding decrypted encoded packets.

6. A method as claimed in claim 5, wherein the step of decrypting the first encrypted packet of data having the first importance level uses a block cipher.

7. A method as claimed in claim 5, wherein the step of decrypting the second encrypted packet of data having the first importance level uses a block cipher.

8. A method as claimed in claim 5, wherein the step of decrypting the first encrypted packet of data having the second importance level uses a block cipher, further comprising using data from the first encrypted packet of data as an initialization vector for said decrypting.

9. A method as claimed in claim 5, wherein the step of decrypting the first encrypted packet of data having the second importance level uses a stream cipher, further comprising using data from the first encrypted packet of data as a key for said decrypting.

10. An encryption system for encrypting a data stream, wherein the data stream comprises encoded packets of data, wherein the system comprises:
    a first encryption unit for encrypting a first encoded packet of data having a first importance level to generate a first encrypted packet;
    a second encryption unit for encrypting a second encoded packet of data having the first importance level to generate a second encrypted packet, wherein the step of encrypting the second packet of data having the first importance level uses the first encrypted packet; and
    a third encryption unit for encrypting a third packet of data having a second, lower, importance level to generate a third encrypted packet, wherein the step of encrypting the first packet of data having the second importance level uses the first encrypted packet;
    wherein the encoded packets are encoded with encoding dependencies that correspond to the importance levels of the encoded packets, such that decoding encoded packets having the second importance level requires a result of decoding an associated encoded packet having the first importance level, and such that encoded packets having the second importance level may be discarded without affecting the ability to decode encoded packets having the first importance level; and
    wherein the first, second, and third encrypted packets are encrypted with encryption dependencies that match the encoding dependencies of the corresponding encoded packets.

11. A decryption system for decrypting a data stream, wherein the data stream comprises encrypted packets of data, wherein the system comprises:
    a first decryption unit for decrypting a first encrypted encoded packet of data having a first importance level to generate a first decrypted encoded packet;
    a second decryption unit for using data from the first encrypted encoded packet of data in decrypting a second encrypted encoded packet of data having the first importance level to generate a second decrypted encoded packet; and
    a third decryption unit for using data from the first encrypted encoded packet of data in decrypting a third encrypted encoded packet of data having a second, lower, importance level to generate a third decrypted encoded packet;
    wherein the first, second, and third decrypted encoded packets are encoded with encoding dependencies that correspond to the importance levels of the first, second, and third decrypted encoded packets, such that decoding decrypted encoded packets having the second importance level requires a result of decoding an associated decrypted encoded packet having the first importance level, and such that encrypted encoded packets having the second importance level may be discarded without affecting the ability to decode decrypted encoded packets having the first importance level; and
    wherein the first, second, and third encrypted encoded packets are encrypted with encryption dependencies that match the encoding dependencies of the corresponding decrypted encoded packets.

12. The method of claim 1, wherein the first, second, and third encrypted packets are encrypted with encryption dependencies that correspond to the encoding dependencies of the corresponding encoded packets, such that decrypting an encrypted packet having the second importance level requires an associated encrypted packet having the first importance level, and such that encrypted packets having the second importance level may be discarded without affecting the ability to decrypt packets having the first importance level.

13. The method of claim 1, wherein the step of encrypting the first packet of data having the first importance level uses a block cipher, and wherein the step of encrypting the first packet of data having the first importance level comprises using a first initialization vector for said encrypting.

14. A method as claimed in claim 1, wherein the step of encrypting the second packet of data having the first importance level uses a block cipher, and wherein the step of encrypting the second packet of data having the first importance level comprises using the first encrypted packet to form a second initialization vector for said encrypting.

15. A method as claimed in claim 14, wherein the step of encrypting the first packet of data having the second importance level uses a block cipher, and wherein the step of encrypting the first packet of data having the second importance level comprises using the second initialization vector for said encrypting.

16. A method as claimed in claim 14, wherein the step of encrypting the first packet of data having the second importance level uses a stream cipher, and wherein the step of encrypting the first packet of data having the second importance level comprises using the first encrypted packet to form a key for said encrypting.

17. A method as claimed in claim 3, wherein first packets of data are encoded in such a way that an entire encoded packet is required in order to decode the encoded packet, the method comprising:
    encrypting the first packets of data by means of a block cipher.

18. A method as claimed in claim 3, wherein second packets of data are encoded in such a way that an entire encoded packet is not required in order to decode a part of the encoded packet, the method comprising:
    encrypting the second packets of data by means of a stream cipher.

* * * * *